United States Patent [19]

Hamilton

[11] Patent Number: 5,045,211

[45] Date of Patent: * Sep. 3, 1991

[54] NO DRAIN ACID TREATMENT OF POOLS

[76] Inventor: Jock Hamilton, 3741 E. Telegraph Rd., Piru, Calif. 93040

[ * ] Notice: The portion of the term of this patent subsequent to Mar. 6, 2007 has been disclaimed.

[21] Appl. No.: 487,581

[22] Filed: Mar. 2, 1990

[51] Int. Cl.$^5$ .............................. C02F 5/08; C02F 1/66
[52] U.S. Cl. .................................. 210/697; 210/743; 210/765; 134/27; 134/28; 252/181
[58] Field of Search ................................. 210/696–700, 210/743, 747, 765, 766, 169; 252/180, 181; 134/3, 27, 28, 41, 42

[56] References Cited

U.S. PATENT DOCUMENTS

| | | | |
|---|---|---|---|
| 2,370,473 | 2/1945 | King | 210/697 |
| 3,000,795 | 9/1961 | Goeldner | 210/696 |
| 3,085,975 | 4/1963 | Jennings | 210/697 |
| 4,357,254 | 11/1982 | Kapiloff et al. | 252/181 |
| 4,802,990 | 2/1989 | Inskeep, Jr. | 210/699 |
| 4,906,384 | 3/1990 | Hamilton | 210/697 |

*Primary Examiner*—Thomas Wyse
*Attorney, Agent, or Firm*—Plante, Strauss, Vanderburgh and Connors

[57] ABSTRACT

There is disclosed a method for the treatment of confined bodies of water such as a swimming pool to remove scale deposits from the surfaces of the vessel containing the water. The water is acidified with a mixture of hydrochloric acid, sulfamic acid and sodium bisulfate to eliminate its total alkalinity, as determined by a standard neutralization test. The water is continuously or repeatedly monitored for total alkalinity following the initial addition of acid, to insure that sufficient acid has been added. The acidified water has a tendency to gain total alkalinity as the scale deposits are removed during the treatment, and monitoring detects this change, permitting correction by addition of acid. After the treatment with the acid, which can last from several hours to several days, any excess treatment acid is neutralized by the addition of a neutralizing agent which is preferably magnesium oxide or magnesium hydroxide. The netralizing agent is added to neutralize the acid and is added in a quantity which does not increase the pH of the pool to a value above about 7.8 to 8.5. It has been observed that the addition of magnesium oxide or hydroxide to the pool without exceeding the aforementioned pH effectively neutralizes the excess treatment acids without contributing to total alkalinity and thereby avoids the tendency of the pool to rescale immediately following treatment.

21 Claims, No Drawings

NO DRAIN ACID TREATMENT OF POOLS

BACKGROUND OF INVENTION

1. Field of Invention

This invention relates to the treatment of water and, in particular, to a treatment for removal of scale deposits and heavy metal salts from any vessel in which water is stored, e.g., a pool or spa or cooling tower.

2. Brief Statement of the Prior Art

Scale is commonly formed on pools, spas, cooling towers and other confined containers of bodies of water in which the total hardness of the water increases with evaporation, resulting in the precipitation of hardness from the water as scale deposits, typically calcium carbonate.

The problem is most noticeable and objectionable in swimming pools and spas because of the unsightly appearance of the scale deposits. The problem, however, is nonetheless present in other applications such as in cooling towers where the scale deposits can clog equipment and interfere with efficient operation.

A common technique for the removal of the deposits has been to drain the water completely from the pool and treat the pool surfaces with various agents. Acids are used for this application, however, the pool industry generally recommends against the use of acid treatments. The danger is that the acid will damage equipment or severely pit or erode plaster surfaces of pools. When acids are used, caution must be exercised to avoid damaging the pool surfaces and to avoid injury to the workmen. The potential for injuries increases when treating indoor pools because of the toxic nature of the acid fumes generated during the treatment. Accordingly, the acid washing of pools to remove scale deposits is practiced only by skilled professionals and is generally not recommended for swimming pool treatment, and particularly not recommended to be practiced by the pool owner.

OBJECTIVES OF THE INVENTION

It is an objective of this invention to provide a method for removal of scale from swimming pools without the necessity for draining the pool.

It is also an object of this invention to provide a method for removal of scale deposits from swimming pools which can be practiced by the pool owner.

It is a further object of this invention to provide a method for removal of scale from swimming pools which is safe and does not risk damaging the pool and equipment.

It a further object of this invention to provide a method for the acid treatment of swimming pools in which the treatment acid is neutralized after the treatment without increasing the total alkalinity of the pool.

It is a further object of this invention to provide a method for the removal of scale deposits from swimming pools in a manner in which the pool does not immediately rescale with fresh deposits.

BRIEF STATEMENT OF THE INVENTION

This invention comprises a method for the treatment of swimming pools and other confined bodies of water to remove scale deposits from the surfaces of the vessel containing the water, usually from the sides of swimming pools and spas. In the method, the water is acidified to eliminate its total alkalinity, as determined by a standard neutralization test. While various acids, including mineral acids such as hydrochloric acid, hypochlorous acid, nitric acid, etc., or organic acids such as acetic, citric, etc., can be added for this purpose, it is preferred to employ hydrochloric acid and a mixture of sulfamic acid and sodium bisulfate.

The method includes continuous or repeated monitoring of the total alkalinity of the water following the initial addition of acid, to insure that sufficient acid has been added. Additionally, it has been noted that the acidified water has a tendency to gain total alkalinity as the scale deposits are removed during the treatment.

After the treatment with the acid, which can last from several hours to several days, the excess of the treatment acid is neutralized by the addition of a neutralizing agent which is preferably magnesium oxide or magnesium hydroxide. The neutralizing agent is added to neutralize the acid and is added in a quantity which does not increase the pH of the pool to a value above about 7.8, and preferably above 8.5. It has been observed that the addition of magnesium oxide or hydroxide to the pool without exceeding the aforementioned pH effectively neutralizes the excess treatment acids without contributing to total alkalinity and thereby avoids the tendency of the pool to rescale immediately following treatment.

DESCRIPTION OF PREFERRED EMBODIMENTS

Scale deposits are commonly formed on the walls of containers such as swimming pools and the like, which contain water having dissolved salts, usually carbonates, commonly referred to as "hardness", and which are subject to evaporation that concentrates the dissolved solids until they precipitate on the surfaces of the container. The hardness in the water is usually carbonates and bicarbonates which commonly precipitate as the salt of the least soluble metal, usually calcium. The precipitates form a grey to dark scale on the surfaces of the container and equipment, usually resulting in discoloring and unsightly appearance on the surfaces of swimming pools and spas, and interfering with efficient operation of cooling towers and other equipment.

This invention comprises the treatment of water to dissolve the scale deposits. The treatment is practiced by acidification of the pool to a predetermined value, monitoring of the total alkalinity of the pool and re-acidification as needed, maintaining the acidified water in contact with the scaled surfaces for sufficient time to dissolve the scale and finally, neutralization of the acid to restore the pool water to an acceptable and usable pH value.

The acidification of the water is accomplished by the addition to the water of a suitably strong acid to dissolve the deposits. Examples of suitable acids include mineral acids, e.g., hydrochloric acid, hypochlorous acid, sulfuric acid, nitric acid, etc., organic acids such as citric acid, acetic acid, etc. Of the aforementioned, sulfamic, sulfuric and hydrochloric acids are preferred. Most preferably, hydrochloric acid is used admixed with sulfamic acid in amounts from 4 to 12 gallons concentrated hydrochloric acid to 10 pounds of sulfamic acid. If desired, sulfuric acid can also be included, preferably by adding sodium bisulfate to form the sulfuric acid in situ.

The hydrochloric acid can be added as a concentrated aqueous solution, typically with a strength from about 25 to about 50 weight percent, preferably about 31.5 weight percent, and the sulfamic acid and sodium bisulfate can be added as a dry powder containing the proper proportions of each to provide the aforementioned quantities of sulfuric and sulfamic acids. The acids are used in a sufficient quantity to completely eliminate the total alkalinity of the pool.

The total alkalinity of water is measured as its acid neutralizing capacity by titrating a water sample with acid to a methyl orange end point (pH of 4.6). Total alkalinity includes caustic, carbonate and bicarbonate alkalinity. The acidification treatment will lower the pH of the water below 7.0, and often below about 6.5.

The invention is practiced generally by the addition to the water of from 1 to about 5 pounds of sulfamic acid and 2 gallons of 31.5% hydrochloric acid per each five thousand gallons of water, and the total alkalinity is then measured. If a detectable total alkalinity is observed, additional quantities of acid can be added in proportions of about one pound or more of acid per 5,000 gallons of water and the total alkalinity is again measured.

Preferably, the acidification treatment is combined with treatment by an metal sequestering and/or chelating additive. Examples of suitable sequestering and/or chelating additives include oxalic acid, polyphosphates, e.g., pyrophosphates, tripolyphosphates, metaphosphates, etc., soluble ammonium salts which form amine complexes with certain metals, and organic chelating agents such as ethylene diamine tetraacetic acid, etc. Mixtures of two or more of these additives can be used. A suitable sequestering chelating composition comprises a mixture of from 5 to 80 weight parts oxalic acid, 5 to 80 weight parts ammonium sulfate, and from 5 to 80 weight parts sodium hexametaphosphate. The sequestering additive is used in an effective amount, usually from about 1 to about 6 pounds per 5000 gallons of water. The actual amount required will depend on the amount of scale to be removed, and can be varied as required over a wide concentration range.

After the water has been acidified to no detectable alkalinity, the water is maintained at this condition for an extended period of time. The length or duration of this treatment will vary, depending upon the severity of the scale deposits. Generally, the period will be no less than several hours and may continue for at least several days. The scale removal can be facilitated by periodic scrubbing of the scale deposits, accelerating their breakdown and dissolution in the acidified water.

As the scale is dissolved, the total alkalinity of the water must be repeatedly monitored or determined to ensure that the total alkalinity is not restored to an objectionable level by the treatment. This is practiced by repeated determinations of the alkalinity at increments of several hours to one day after commencement of the treatment.

After the treatment has effectively removed the scale deposits, the pool is restored for normal use. This is accomplished by neutralization of the treatment acid. Any alkaline additive can be used to neutralize the treatment acids, including sodium or potassium hydroxides, and carbonates or bicarbonates of sodium, potassium, calcium and magnesium. The most preferred neutralizing additive is magnesium oxide or magnesium hydroxide. Preferably magnesium oxide is employed. It has been observed that the neutralization of treatment acids with other bases such as sodium carbonate and the like will result in a tendency for the water in the pool to rescale the pool surfaces. This occurs because most neutralizing agents, such as sodium carbonate, restore the total alkalinity, often elevating it to a value such as 100 to 150 ppm total alkalinity or higher. When this occurs, the pool again becomes unstable and deposits are formed quite rapidly.

The use of magnesium oxide or hydroxide for the neutralization of the treatment acid avoids the tendency of the pool to rescale. This tendency is entirely avoided provided the pool is neutralized to a pH value no greater than about 8.5, and preferably no greater than about 8.2. At these pH values it has been observed that the pool will be quite stable and will not redeposit scale when returned to normal service and use.

The quantity of magnesium oxide required for the neutralization will depend, of course, on the quantity of treatment acid employed during the acidification treatment. Generally the amount of neutralizing agent, expressed as magnesium oxide, will be from about 1 to about 8 pounds per 5,000 gallons of water.

Preferably, the magnesium oxide is dissolved in a solution or suspension prior to addition to the main body of the pool water. For this purpose, the magnesium oxide can be dissolved at a concentration of about 1 to 5 pounds for 5 gallons of water and the resulting solution and suspension of magnesium oxide can then be dispersed into the main body of the pool water.

The magnesium oxide is also available in solid prills having dimensions of approximately 0.05 to about 0.5 inch in diameter and length. The most commonly available size is 1/16 inch in diameter and length. The required neutralization and pH maintenance can readily be achieved by placing a basket of the aforementioned prills of magnesium oxide in the pool or in the circulation lines, e.g., in the return line to the pool from the filter. A convenient installation is similar to that used with erosion devices in which a small, separate chamber is provided in which the additive chemical is stored. A water by-pass line is provided to divert water, either by pressure, or by use of a venturi, through the chamber, thereby providing a metered control over the chemical addition. This device can also be used with the method of this invention, by placing the solid magnesium oxide particles in the chamber, preferably within a basket which retains the particles in the chamber, as they slowly dissolve.

Most swimming pools are also provided with skimmers, which have many different configurations. These skimmers, however, all have a solids evacuation device which is supported within the pool and evacuates water with accumulated solids and debris from the pool. The magnesium oxide can be placed in a container carried by the skimmer, to provide a slow release source of magnesium oxide directly in the pool. As with the previously mentioned devices, the magnesium oxide is also preferably placed within a basket which will retain the magnesium oxide in the container and permit it to slowly dissolve in the water of the pool, as needed to maintain the desired pH.

The basket can be formed of a wire mesh spaced sufficiently close to retain the prills, e.g., 20 to 100 mesh, U.S. Standard screen can be used. The prills will slowly dissolve, as needed to maintain the pH of the water between about 7.8 and 8.5. A quantity of approximately 10 pounds of prills will be sufficient to maintain the pH of a typical 10,000 gallon pool for a period of 30 to 45 days.

The treatment provides the advantages of a facile removal of scale deposits which can be practiced by the pool owner without requirement of skilled and professional assistance. A major advantage of the treatment is that it can be practiced without the necessity to drain the pool thereby avoiding any potential structural damage by collapse of the pool walls as well as any potential danger of personal injury resulting from falls into an empty pool. Because the pool is not drained there is also a very significant reduction in the costs of treatment as well as a substantial conservation of water. Additionally, the descaling of the walls is accomplished with acid at very dilute concentrations thereby avoiding the potential injury or toxic effects from handling of concentrated acid and breathing of fumes from the treatment with concentrated acids. The neutralization step of the method is quite effective and rapid and provides the treatment with a very precise control over the time or duration of the treatment thereby providing the capability of controlling and curtailing the severity of any damage to the surfaces, e.g., etching of plaster walls of pools, etc.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. The method for removing scale deposits from the scaled surfaces of vessels containing water without draining the vessel which comprises:
    a. acidifying the water by the addition of an acid thereto in an amount sufficient to eliminate all total alkalinity from the water;
    b. monitoring the total alkalinity of the water after the addition thereto of said acid by repeated determination of total alkalinity, and adding an additional quantity of acid, as necessary to eliminate any detected total alkalinity;
    c. permitting the resultant acidified water to remain in contact with said scaled surfaces for a treatment period from ½ to about 240 hours; and
    d. neutralizing the water after said treatment period by the addition thereto of magnesium oxide or hydroxide in an amount sufficient to raise the pH value of the water to a value slightly below, but not exceeding, 10.5.

2. The method of claim 1 wherein the total alkalinity of said water is determined approximately 2 to 24 hours after the first acidification addition, and a sufficient quantity of acid is added, as necessary, to eliminate any total alkalinity of said water as detected by said repeated determination.

3. The method of claim 1 wherein the pH is maintained below 7.0 during the acidification treatment step for a predetermined time, sufficient to remove scale deposits, during the treatment.

4. The method of claim 3 wherein a chelating agent is added to the liquid during said acidification treatment step.

5. The method of claim 1 wherein said total alkalinity is monitored throughout the acidification treatment of said water, and any additional quantities of acid are added, as needed to maintain said water free of any total alkalinity.

6. The method of claim 1 also including the step of adding a water-soluble, metal chelating agent to said water.

7. The method of claim 6 wherein said chelating agent is a water-soluble polyphosphate.

8. The method of claim 7 wherein said chelating agent is oxalic acid.

9. The method of claim 7 wherein said chelating agent is a mixture of oxalic acid and a water-soluble polyphosphate.

10. The method of claim 1 wherein said neutralizing additive is an alkaline earth metal oxide or salt.

11. The method of claim 10 wherein said neutralizing agent is magnesium oxide.

12. The method of claim 11 wherein said magnesium oxide is dissolved in a water solution having a concentration of about 0.02 to about 10 weight percent.

13. The method of claim 11 including the step of adding said magnesium oxide in the form of prills having a size averaging about 1/16 inch to provide a slow release of said magnesium oxide to said water.

14. The method of providing a pH control of a body of water over an extended time period at a value from 7.0 to about 10.5 by suspending magnesium oxide prills having a diameter and a length between about 0.1 to about 0.5 inch in said water to provide a slow release of magnesium oxide in said water in sufficient amounts to neutralize acidic components therein.

15. The method of claim 14 wherein said magnesium oxide prills are placed in a foraminous container and said container is placed in said water.

16. The method of claim 15 wherein said foraminous container is a wire basket.

17. The method of claim 14 wherein said body of water is contained within a vessel and said vessel is connected with water circulation lines to a remotely located filter to transfer water from said vessel to said filter and back to said vessel, and wherein said basket is placed in said circulation lines.

18. The method of claim 14 wherein a separate containment chamber is provided with water by-pass lines communicating to said chamber and returning to said circulation lines and said solid magnesium oxide particles are placed in said chamber.

19. The method of claim 14 wherein said vessel is a swimming pool.

20. The method of claim 19 wherein said swimming pool also includes a skimmer to filter solids from said body of water within said swimming pool and said basket is placed in said skimmer.

21. The method of claim 14 wherein said vessel is a spa.

* * * * *